INVENTOR.
CONSUELO STOKES MILNER
BY Ernest F. Weinberger
Max H. Sarnes
ATTORNEYS Aug. 17, 1965 C. S. MILNER 3,201,621

THERMALLY STABILIZED CRYSTAL UNITS

Filed March 18, 1963 2 Sheets-Sheet 2

INVENTOR.
CONSUELO STOKES MILNER
BY Ernest J Weinberger
Max J. Garner
ATTORNEYS

United States Patent Office 3,201,621

Patented Aug. 17, 1965

3,201,621

THERMALLY STABILIZED CRYSTAL UNITS

Consuelo Stokes Milner, Hollis, N.Y., assignor to the United States of America as represented by the Secretary of the Navy Filed Mar. 18, 1963, Ser. No. 266,109

13 Claims. (Cl. 310—8.9)

Figure 1:
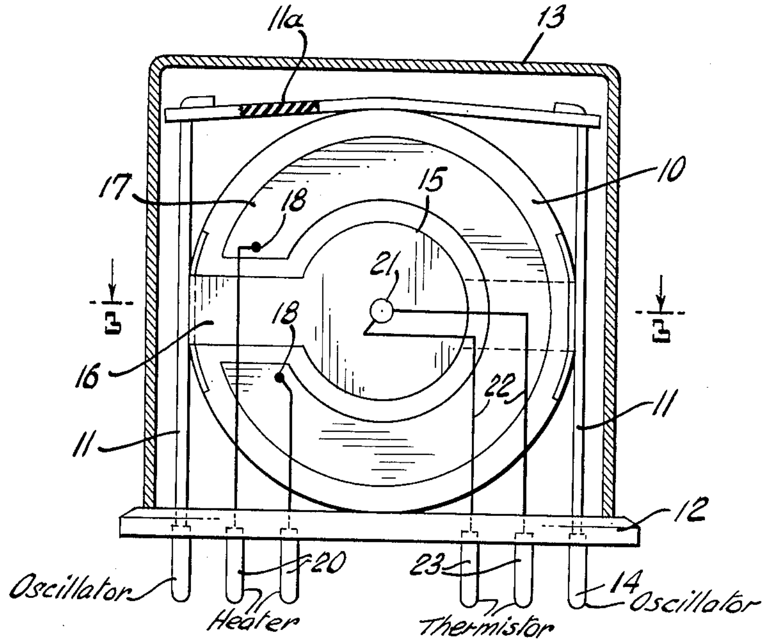

(Granted under Title 35, U.S. Code (1952), sec. 266)

The invention described herein may be manufactured and used by or for the Government of the United States of America for governmental purposes without the payment of any royalties thereon or therefor.

This invention relates to piezoelectric crystal units and more particularly to the means for rapidly stabilizing the temperature environment under which the crystal oscillates whereby the frequency of oscillation is stabilized.

Piezoelectric crystals find their greatest utility as control elements in oscillators where they accurately control the frequency of oscillation. It is their accuracy and relative stability as compared to the circuit components of an electronic oscillator that are responsible for their almost complete universal frequency control use. The inherent ability of a properly fabricated crystal to sharply resonate an oscillator or filter circuit accounts for its primary importance. Certain environmental parameters, however, do, if not compensated for or controlled, degrade to some extent the sharpness of the resonance. One of these parameters and the one of concern in this invention, is temperature. In other words, the value and effectiveness of a piezoelectric crystal depends to a large extent upon the temperature at which it operates since most crystals do not maintain a constant resonant frequency over any extended temperature variation.

Certain cuts of crystals have been developed which exhibit a very low temperature coefficient. It is well known in the art that the so-called "zero coefficient" orientations such as the AT, BT and the like drift appreciably over the wide range of ambient temperatures now encountered in practical usage. It has, therefore, been necessary where close frequency tolerances are required, to enclose or surround the crystal with a controlled environment usually in the form of a heating oven. These ovens are generally employed with highly stable crystal oscillators to provide and maintain the necessary precision frequency control. These ovens which are relatively large, have two basic drawbacks or limitations. First, they occupy approximately 30% of the volume of the entire oscillator and secondly, they require extended warm-up periods before stabilized operation is attained. Depending on the particular crystal and the ambient temperatures, stabilization periods up to 12 hours are necessary. Other techniques which do not employ bulky ovens to control the crystal temperature have been found to improperly load the crystal itself by deleteriously altering its resonant operating frequency, thereby making these techniques impractical except in very limited cases.

In view of miniaturization techniques available, the present requirements in saving of both weight, space and quick operation, it is desirable to provide small compact crystal units with a minimum warm-up period. It is, therefore, an object of this invention to provide an efficient, simple, inexpensive, reliable, highly stable, compact crystal unit capable of attaining a stabilized operation within minutes.

It is a further object of this invention to provide a means for maintaining a constant, stable, crystal temperature without any appreciable loading of the oscillating element or change in resonance.

Other objects and advantages will appear from the following description of an example of the invention, and the novel features will be particularly pointed out in the appended claims.

Figure 2:
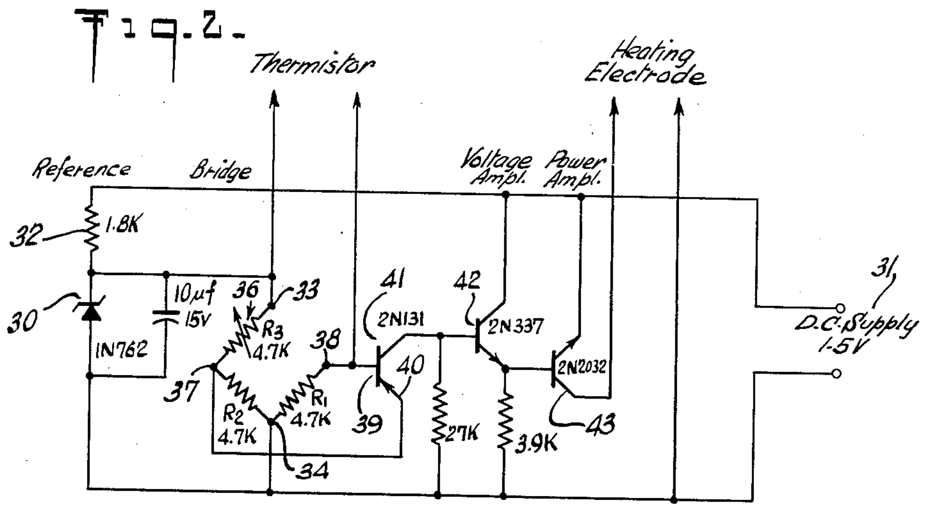
Figure 3:
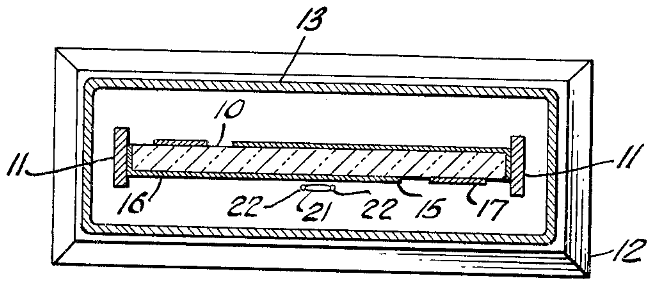
Figure 4:
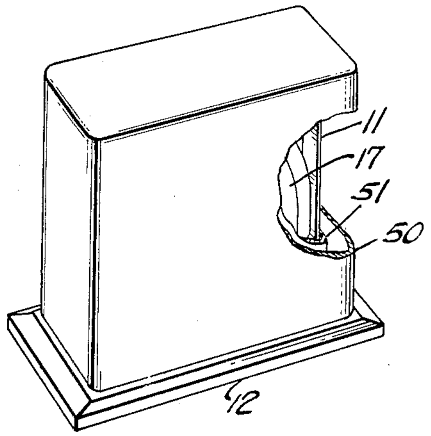

In the accompanying drawings:

FIG. 1 is a front elevation of an embodiment of a crystal unit made in accordance with this invention, with the front of the housing removed, FIG. 2 is a schematic representation of a proportional temperature controller used in conjunction with the crystal, FIG. 3 is a sectional plan view taken approximately through 3—3 of FIG. 1, and FIG. 4 is an embodiment of the invention exemplifying a double walled envelope or housing.

In the embodiment of the invention illustrated in FIG. 1, a wafer-like generally circular piezoelectric crystal 10 (e.g. quartz) is supported by upright metal legs 11 disposed on opposite sides of the crystal. These legs extend downwardly through a dielectric support 12 and that part of the legs external of the housing or envelope 13 serve as pin connectors 14. A similar support or spacer 11*a* joins the upper portions of the legs 11 above the crystal and together provide a relatively rigid support structure for the crystal and its appurtenant electrodes. Opposite faces of the crystal are in practice electroded with either a gold or silver film and these electroded areas 15 generally cover a central circular portion of the crystal face leaving an outer ring-like free area on the face. The active electrodes 15 are joined to the legs by way of a contiguous electrode neck section 16. This entire structure described above is well known in the art and in common usage.

The crystal unit when in use, as for example, in controlling the frequency of an oscillator, is subject to ambient and operating temperature variations which change the resonance of the crystal and thereby the oscillator frequency. This instability is usually overcome by placing the crystal unit into a temperature controlled oven but as previously mentioned, this procedure has certain inherent limitations. On the other hand, any structure affixed to the crystal, to some extent, affects through mass-loading, the resonant characteristics of the unit. Yet, the closer the heat source is to the crystal, the sooner or more rapidly the unit can be brought up to its stable operating temperature and the temperature cyclic variation reduced.

A generally horseshoe-shaped heating electrode 17 is disposed on the crystal face and coaxial with and spaced from the active electrode, thereby insuring even heat distribution and stability. Preferably this electrode 17 is an electrically conductive film having an electrical resistance sufficient to cause it to radiate heat even at low supply voltages. Whereas the active electrode is a film of pure gold or silver which has been evaporated onto the crystal, the heating electrode may be of an electrically conducting paint applied directly to the crystal face. This conducting paint must be such that its conductivity be proper for heating and yet remain substantially constant over prolonged use at elevated temperatures while physically remaining flexible enough to allow proper motion of the crystal faces when oscillating without rupturing. Many such paints are commercially available with various metallic conductors. One such paint found satisfactory is made by Micro-Circuits Co., New Buffalo, Michigan, and designated by them as SC13 Silver Micropaint. The silver conducting paint provides the maximum heating capability with the minimum thickness and area compatible with the crystal element as well as requiring the minimum power. The paint may be applied to the crystal in any suitable manner such as brushing, spraying, dipping, etc. and it forms a relatively permanent bond on the crystal surface. When providing a heating electrode only on one face of the crystal, results indicate that this arrangement is satisfactory in most instances, but where extremely short warm-up periods are necessary, a heating electrode disposed on each face is superior. The two electrodes can be tied in parallel to produce equal heating of each side within the crystal unit. Terminals for external connection of the heating electrode must be provided on opposite free ends of the electrode without any appreciable increase in the crystal loading. Conductive epoxy silver solder can be used to form terminals 18 on the heating electrode since they exhibit good conductivity, high bond and shear strengths and do not require either heat or flux in their application, nor extended curing periods. An example of one such material is an Epoxy Silver Solder Number 3021 manufactured by Joseph Waldman & Sons, Epoxy Products Division, Irvington, New Jersey, and described in their Information Bulletin No. 7. The solder affixes to the heating electrodes, wires 19 which pass through dielectric support 12 and terminate in external pins 20.

In order to provide a temperature sensitive or sensing device as close as possible to the crystal a bead type (diameter .006–.060 in.) thermistor 21 is supported by wires 22 proximate the center of the crystal but slightly spaced therefrom. These wires are connected or terminated in pins 23 external of the housing 13. These six pins provide the means for external connection to the internal elements of the crystal unit, namely, a pair each for the active electrodes, heating electrodes and the thermistor. Thermistors, or thermally sensitive resistances, are devices made of solid semiconductors the electrical resistance of which varies markedly with temperature. Their negative resistance-temperature curves are very nearly straight lines and so they are quite well suited for temperature compensation and control.

In general, and by way of example, all crystals perform best at some specific temperature with quartz, itself operating at approximately 75° C. With an oven heater considerable time and energy must be consumed before the crystal is brought up to the proper temperature since the thermal energy applied must first penetrate the crystal unit housing and then first commence to elevate the crystal temperature. With the heating electrode disposed inside the housing both the energy source and the control mechanism must be located externally and to this end the proportional temperature controller illustrated in FIG. 2 is provided.

Basically the controller comprises a source of reference voltage, a bridge circuit voltage and power amplifier stages and a source or supply of electrical energy. Primarily the advantage of this proportional controller as opposed to the on-off type is that it steadily supplies just enough energy (heat) to keep the system in thermal equilibrium. This is necessary due to the continuous loss of heat through the housing. The on-off controller must continually supply more heat than is necessary during its on period to compensate for the loss of heat during its off period. This produces a temperature oscillation that is reflected by and in the crystal frequency stability.

A reference voltage is generated across the Zener diode 30, from the division of the D.C. voltage supply 31 (source not shown) across it and resistor 32. This reference voltage is applied across points 33 and 34 of bridge 35 which comprises three equi-valued resistance arms, one of them, resistor 36 being variable and a fourth unknown arm. The thermistor pins 20 are connected into the unknown arm to complete the bridge. The bridge midpoints 37 and 38 are applied between the base 39 and emitter 40 of amplifier transistor 41 which constitutes the first of a two-stage conventional transistor voltage amplifier. The output of the second transistor 42, an emitter follower, feeds power amplifier transistor 43 which in turn controls the heater electrode current by having its emitter-collector in series with the heater electrode. The entire circuit is arranged to supply a minimum current through the heater electrode which will generate sufficient heat to compensate for any thermal losses. The thermistor senses the crystal temperature and when this is below, for example, 75° C. the resistance of the thermistor is such that it causes an unbalance across 37–38 of the bridge. This unbalance finally results in an increase over the minimum supply current which causes an elevation of the crystal temperature to 75° C. With the heating electrode located proximate the crystal, the time necessary to increase the temperature from room ambient (approximately 25° C.) to 75° C. is quite short and the heating energy is kept to a minimum. Essentially the controller is an electrical feedback circuit wherein the thermistor parameter is compared in the bridge with a reference (variable) and this unbalance drives the heating electrode via the amplifier. The thermistor's resistance variation with crystal unit temperature is used in one arm of the resistance bridge.

In order to more fully comprehend the spatial relationships involved, FIG. 3 illustrates the placement of the electrodes with respect to the remaining structure. The thermistor is spaced from and in front of the active electrode 15. Although only one such thermistor is shown, it is possible to employ two such sensors, each opposite one crystal face. Of course, whether or not two thermistors are employed, two heating electrodes 17 on opposite faces provide both more rapid and uniformly distributed heat. In this case they may be either wired in series or parallel depending on the particular crystal and power supply.

As aforementioned, it is the thermal losses through the housing or envelope walls which demand that a continuous supply of thermal energy be provided to compensate for this constant loss. As illustrated in FIG. 4, the envelope therein is made up of two spaced apart housings 50 and 51. The space between the walls of the envelopes may either be filled with a thermal dielectric (poor thermal conductivity) material or gas, so that the transmission or transfer of heat therethrough is greatly attenuated with the attendant benefits aforementioned. The combination, en toto, contemplated by this invention includes a particular heating electrode of a specific shape, a centrally disposed temperature sensing element, a proportional temperature controller, a separate heater supply, and a spaced apart double wall envelope.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A rapid temperature stabilized piezoelectric structure including a crystal mounted on a support structure, said crystal having oppositely partially electroded active faces, the electroded portions of said faces being generally circular and centrally disposed which comprises:

(a) a generally horseshoe-shaped heating electrode disposed in intimate contact with one of said faces, coaxial with and spaced from said electroded portions, (b) a source of electrical energy, (c) a temperature sensitive resistance supported proximate said crystal for sensing the temperature of said crystal, (d) electrical means operatively connecting said resistance, the ends of said heating electrode and said source whereby said resistance will vary the heating energy supplied to said heating electrode in accordance with the temperature of said crystal.

2. The piezoelectric structure according to claim 1, wherein said electrical means includes a proportional temperature control network.

3. The structure according to claim 2, wherein said network maintains a continuous minimum supply of heating energy to said crystal sufficient to maintain the crystal at its proper stabilized operating temperature.

4. The structure according to claim 1, wherein said heating electrode is a film of electrically conducting silver paint.

5. The structure according to claim 4, wherein said temperature sensitive resistance is a thermistor.

6. The structure according to claim 5, wherein an additional heating electrode is disposed on the other of said active faces.

7. The structure according to claim 6, further including an envelope having therein said crystal, said thermistor and said electrical means.

8. The structure according to claim 7, including a second envelope spaced from and encompassing said first-mentioned envelope.

9. The structure according to claim 8, wherein said envelopes are of a thermal dielectric material.

10. The structure according to claim 9, wherein said material is glass.

11. A rapid temperature stabilized piezoelectric unit including a wafer-like crystal mounted on a support structure, said crystal having generally circular, centrally disposed active electrodes on opposite faces which comprises:

(a) a closed envelope having therein said crystal and support structure, (b) a generally horseshoe-shaped heating electrode of a silver electrical conducting paint disposed on one of said faces, coaxial with and spaced from said active electrode, (c) a pair of wires connected to the ends of said heating electrode and extending therefrom, through and out of said envelope, (d) said supporting structure having a pair of conductors connected to said active electrodes and extending through and out of said envelope, (e) a bead thermistor within said envelope central of said active electrode, spaced therefrom and supported by a pair of relatively stiff wires which are in electrical contact therewith and extend through and out of said envelope, (f) a proportional temperature controller having as a part thereof a multiple arm bridge network and a current control means, (g) a source of electrical energy, (h) a series path having connected therein said control means and said heating electrode and said source, said thermistor connected across one arm of said bridge, whereby any unbalance of said bridge caused by a change in the resistance of said thermistor will cause a proportional variation in the current flowing in said series path.

12. The unit according to claim 11, wherein said controller maintains a minimum current through said heating electrode sufficient to compensate for heat losses through said envelope.

13. The unit according to claim 12, further including a second closed envelope having therein and spaced from said first mentioned envelope with said wires, stiff wires and conductors passing therethrough.

References Cited by the Examiner

UNITED STATES PATENTS

| | | | |
|---|---|---|---|
| 2,660,680 | 11/53 | Koerner | 310—8.9 |
| 2,676,275 | 4/54 | Bigler | 310—8.9 |
| 2,969,471 | 1/61 | Schneider | 310—8.9 |
| 3,040,158 | 6/62 | Cutler et al. | 310—8.9 |

FOREIGN PATENTS

| | | |
|---|---|---|
| 824,786 | 12/59 | Great Britain. |

ORIS L. RADER, *Primary Examiner.*

MILTON O. HIRSHFIELD, *Examiner.*